United States Patent
Lee et al.

(10) Patent No.: US 7,158,798 B2
(45) Date of Patent: Jan. 2, 2007

(54) LOCATION-BASED AD-HOC GAME SERVICES

(75) Inventors: Chinmei Chen Lee, Woodridge, IL (US); Douglas William Varney, Naperville, IL (US); Jie Zhou, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 301 days.

(21) Appl. No.: 10/376,918

(22) Filed: Feb. 28, 2003

(65) Prior Publication Data

US 2004/0185881 A1   Sep. 23, 2004

(51) Int. Cl.
*H04Q 7/20* (2006.01)
*G06F 17/00* (2006.01)

(52) U.S. Cl. .............................. 455/456.3; 455/414.1; 463/42

(58) Field of Classification Search .. 455/456.1–456.6, 455/457, 414.1, 414.2, 566, 556.1, 556.2, 455/557, 466; 463/7, 9, 39–42; 700/91–93
See application file for complete search history.

(56) References Cited

U.S. PATENT DOCUMENTS

| | | | | |
|---|---|---|---|---|
| 5,738,583 A * | 4/1998 | Comas et al. | ................. | 463/40 |
| 5,746,656 A * | 5/1998 | Bezick et al. | ................. | 463/42 |
| 5,942,969 A * | 8/1999 | Wicks | ................... | 340/286.02 |
| 6,117,013 A * | 9/2000 | Eiba | ............................. | 463/41 |
| 6,416,414 B1 * | 7/2002 | Stadelmann | ................ | 463/42 |
| 6,524,189 B1 * | 2/2003 | Rautila | ........................ | 463/40 |
| 6,527,641 B1 * | 3/2003 | Sinclair et al. | ............... | 463/39 |
| 6,542,750 B1 * | 4/2003 | Hendrey et al. | ......... | 455/456.1 |
| 6,569,011 B1 * | 5/2003 | Lynch et al. | ................... | 463/1 |
| 6,585,597 B1 * | 7/2003 | Finn | ........................... | 463/40 |
| 6,650,892 B1 * | 11/2003 | Thiriet | ....................... | 455/419 |
| 6,735,435 B1 * | 5/2004 | Newell et al. | .............. | 455/419 |
| 6,756,882 B1 * | 6/2004 | Benes et al. | ............ | 340/323 R |
| 6,785,561 B1 * | 8/2004 | Kim | ........................... | 455/566 |
| 6,908,389 B1 * | 6/2005 | Puskala | ....................... | 463/40 |
| 6,985,747 B1 * | 1/2006 | Chithambaram | ......... | 455/456.5 |
| 2001/0003191 A1 * | 6/2001 | Kovacs et al. | ............. | 709/226 |
| 2002/0065097 A1 * | 5/2002 | Brockenbrough et al. | .. | 455/552 |
| 2003/0006931 A1 * | 1/2003 | Mages | ................... | 342/357.06 |
| 2003/0114224 A1 * | 6/2003 | Anttila et al. | ................ | 463/40 |
| 2003/0125112 A1 * | 7/2003 | Silvester | ..................... | 463/42 |
| 2004/0198403 A1 * | 10/2004 | Pederson et al. | .......... | 455/517 |

* cited by examiner

*Primary Examiner*—Charles N. Appiah

(57) ABSTRACT

A method is provided for administering a game over a wireless telecommunications network (30) serving a number of mobile terminals (20). The wireless telecommunications network (30) includes a number of base stations (32) providing wireless communication coverage for corresponding geographically defined cells (34). The method includes: establishing a game offering in response to a triggering event; designating a region in response to the established game offering; locating mobile terminals (20) within the designated region; sending over the wireless telecommunications network (30), to mobile terminals (20) within the designated region, an invitation to participate in a game in accordance with the established game offering; and, collecting over the wireless telecommunications network (30), from mobile terminals (20) to which the invitation was sent, responses to the invitation, the responses indicating that the invitation to participate in the game has been accepted or declined.

18 Claims, 2 Drawing Sheets

LOCATION-BASED AD-HOC GAME SERVICES

FIELD

The present invention relates to the art of wireless telecommunications. It find particular application in conjunction with organizing, administering and playing games over a wireless telecommunications network, and will be described with particular reference thereto. However, it is to be appreciated that the present invention is also amenable to other like applications.

BACKGROUND

A mobile terminal (MT) (e.g., a mobile telephone, wireless personal digital assistant (PDA), wireless equipped portable or laptop computer, etc.) is often equipped for various types of communication and communication protocols depending on the form the MT takes. These various types of communication and protocols and their implementations are commonly known. They include both voice and data communication services, for example, short message service (SMS), wireless application protocol (WAP), text messaging, voice communications, instant messaging (IM), electronic mail (e-mail), and the like.

A wireless service provider (WSP) provides wireless telecommunication services to users' of mobile terminals. In order to attract and retain customers, WSPs are interested in providing services that are in demand. Further, in order to maximize revenue, WSPs often desire to promote and encourage the use of the services they offer.

Like any individual, MT users (i.e., subscribers to wireless services) often find themselves in situations where they would appreciate being entertained, e.g., to pass the time or otherwise. Accordingly, this presents an additional opportunity for a WSP to provide a service to the MT user, i.e., in addition to the customary services already provided by the WSP. Offering a game playing service in which the MT user may participate in a game takes advantage of this opportunity while providing the MT user a way to pass the time and/or otherwise be entertained.

Certain game playing options for mobile terminals and/or their users have previously been developed. However, many of these options are limited in one way or another. For example, in some cases, games are programmed into and playable on the MT in a fashion similar to other traditional handheld electronic games. However, these games do not rely on the wireless services offered by the WSP, nor are they interactive with other MT users or players, i.e., they are self-contained entirely within the MT itself. The foregoing aspects may be disadvantageous in certain respects, e.g., the WSP does not benefit from the player utilizing its service. Likewise, the player may wish to compete against and/or interact with one or more other players, perhaps, depending on the game, within the same general location as themselves.

Furthermore, it is desirable in many respects to proactively initiate games in an ad-hoc (i.e., spontaneous or impromptu) manner. In this way, by selecting and/or targeting appropriate scenarios and/or circumstances, WSPs can productively prompt usage of their game play services and effectively capitalize upon opportunities which might otherwise be lost. From the user/player's perspective, the ad-hoc nature of game initiation can also be beneficial. That is to say, the user/player is relieved of the burden of actively initiating each game which may include having to set-up a predetermined time and/or location for the game, limiting game play to predetermined participants with which time and/or location determinations have to be coordinated prior to game play, etc. The user/player, however, may not always be aware of the exact time or place in which they may find themselves wanting to play a game, and so no game is pre-planned or scheduled by the user/player. Without ad-hoc game initiation, that user/player (i.e., one who otherwise wants to play a game but has not pre-planned or scheduled a game) may represent a lost opportunity for the WSP to provide a revenue generating service.

The present invention contemplates a new and improved location-based ad-hoc game playing service which overcomes the above-referenced problems and others.

SUMMARY

In accordance with an aspect of the present invention, a method is provided for administering a game over a wireless telecommunications network serving a number of mobile terminals. The wireless telecommunications network includes a number of base stations providing wireless communication coverage for corresponding geographically defined cells. The method includes: establishing a game offering in response to a triggering event; designating a region in response to the established game offering; locating mobile terminals within the designated region; sending over the wireless telecommunications network, to mobile terminals within the designated region, an invitation to participate in a game in accordance with the established game offering; and, collecting over the wireless telecommunications network, from mobile terminals to which the invitation was sent, responses to the invitation. The responses indicate that the invitation to participate in the game has been accepted or declined.

In accordance with another aspect of the present invention, a game service system administers games over a wireless telecommunications network serving a number of mobile terminals. The wireless telecommunications network includes a number of base stations providing wireless communication coverage for corresponding geographically defined cells. The game service system includes: means for establishing a game offering in response to a triggering event; means for designating a region in response to the established game offering; means for locating mobile terminals within the designated region; means for sending over the wireless telecommunications network, to mobile terminals within the designated region, an invitation to participate in a game in accordance with the established game offering; and, means for collecting over the wireless telecommunications network, from mobile terminals to which the invitation was sent, responses to the invitation, the responses indicating that the invitation to participate in the game has been accepted or declined.

One advantage of the present invention is the ability to provide for ad-hoc game playing over a wireless telecommunications network.

Another advantage of the present invention is the ability to provide WSPs the option of proactively prompting use of their offered wireless services.

Still further advantages and benefits of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION

Figure 1:
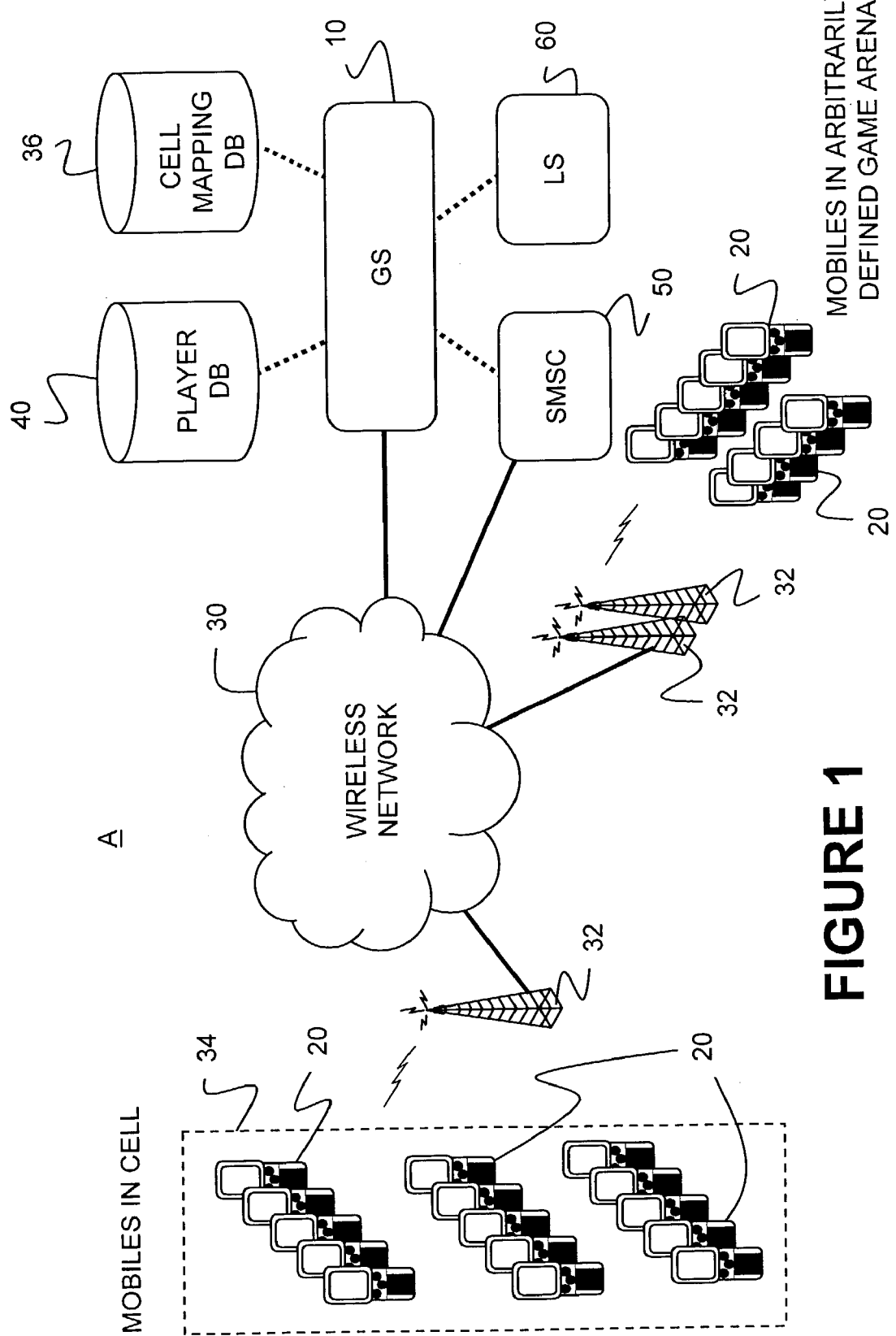
FIG. 1 is a diagram illustrating an exemplary telecommunications system supporting a location-based ad-hoc wireless game playing service in accordance with aspects of the present invention.

With reference to FIG. 1, a telecommunications system A includes a game server (GS) 10 which administers location-based ad-hoc (i.e., spontaneous or impromptu) games to a plurality of mobile terminals 20 over a wireless communications (voice and/or data) network 30 including a number of base stations 32, each base station (BS) 32 corresponding to a geographically defined cell 34. A database 36 relates or maps the geographic location and/or area associated with each cell 34 to one or more base stations 32 that provide coverage therefor.

Suitably, the games played may include a scavenger hunt, a trivia game, tag, a dating game, hide and seek, "I spy" or the like. Upon completion of a game, one or more winners may receive one or more designated or selected prizes. The games played are suitably defined within a geographic boundary, nominally termed herein the game arena, and may center around a scheduled event where people or crowds are likely to gather. For example, the game arena may be an amusement park, a zoo, a shopping mall, a fair grounds, an airport or bus or train terminal, a parade route, a stadium or concert hall, a town square, or the like, and exemplary events may include a parade, a county or state fair, a sporting event, a concert, a sponsored or other promotional event, a holiday or other celebration, etc. Of course, other suitable scenarios (i.e., combinations of locations and/or events) are also contemplated for game play. Factors to consider in selecting a suitable scenario may include the number of potential participants in a selected game arena, and the likelihood of those potential participants joining in a selected game. Scenarios which involve a large number of potential participants are generally good candidates for game play from the perspective of the game service provider. Similarly, scenarios in which potential participants may desire amusement, entertainment or simple distraction are also generally good candidates for game play, e.g., when potential participants have "time to kill" such as when waiting in line, riding a bus or train during a daily commute, or the like, they may want some form of amusement or entertainment to pass the time.

Suitably, each user desiring to selectively participate in ad-hoc games administered by the GS 10 registers their respective MT 20 in advance of game play. That is to say, potential game players (i.e., users) selectively subscribe to the game service being provided, e.g., which may be provided by the same WSP that otherwise provides wireless service for their MT 20. Information regarding registered players in maintained in a database 40. The database 40 may include identifying data for each user/player such as their name (real and/or an arbitrarily selected pseudonym or screen name), the phone number and/or other id for their MT 20, optional password, etc. The database 40 may also contain billing information for each user/player such as a billing address, credit or debit card information, etc. Further, user/player preferences may also be maintained in the database 40 including, e.g., which games the player favors, when the player prefers to play, the locations in which the player prefers to play, etc. Suitably, the preferences are self selected by each player, or the preferences are generated by monitoring the player's behavior (i.e., by tracking the history of a player's actual use of the game service).

In a suitable embodiment, a short message service center (SMSC) 50 provides for short message service (SMS) communication between the GS 10 and each mobile terminal (MT) 20. Of course, other types of wireless communications and/or communication protocols including, e.g., voice communications, text messaging, e-mail, IM, WAP, etc., may provide for communication between the GS 10 and each MT 20.

A location server (LS) 60 periodically provides location information for each MT 20 to the GS 10. The location information is suitably obtained by triangulating (either through time difference or angle of arrival or multipath analysis) the position of each MT 20 with respect to two or more base stations 32, as is known in the art. Optionally, an MT 20 may be provisioned with global positioning satellite (GPS) equipment, in which case obtained GPS data may be used to establish the location information for that MT 20, or a wireless assisted GPS technique may be used. Other handset mechanisms such as Advanced Forward Link Trilateration or Observed Time Difference or a less accurate mechanism such as locating the MT 20 within a sector of a cell 34 may also optionally used to obtain location information for the MTs 20.

Figure 2:
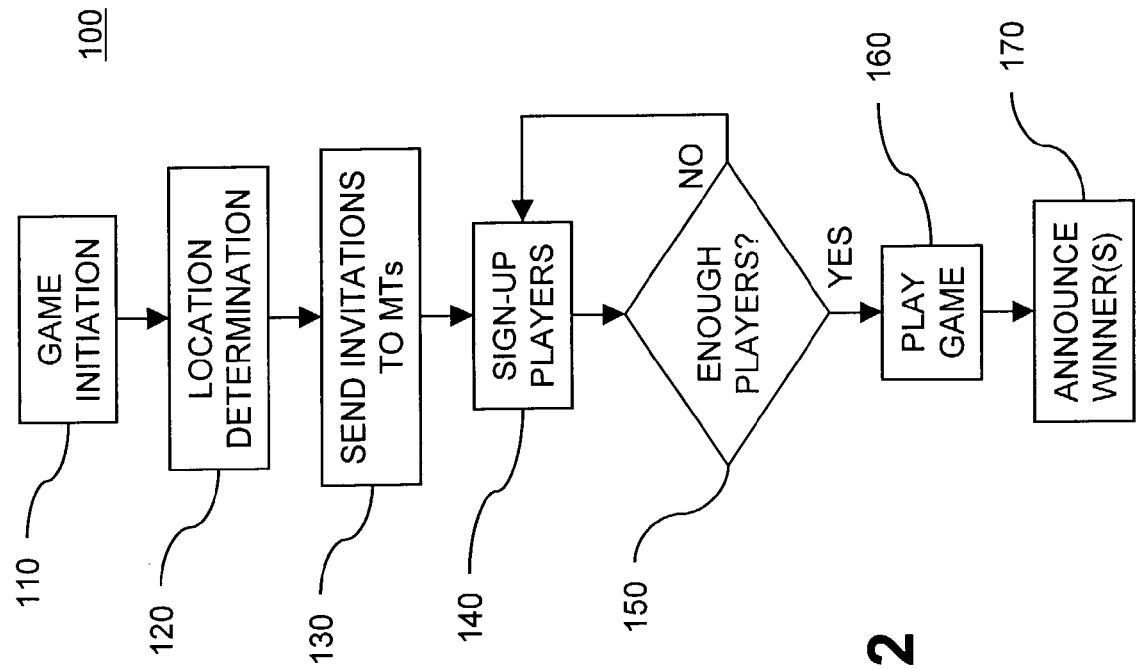
FIG. 2 is flow chart illustrating an exemplary location-based ad-hoc wireless game playing process in accordance with aspects of the present invention.

With reference to FIG. 2, an exemplary location-based ad-hoc game playing process 100 begins with a game initiation step 110. At the game initiation step 110 a game request is processed by the GS 10. The game request may be entered directly into the GS 10 or received from a remote location, e.g., over the network 30. Suitably, the game request is made by a staff member or team assigned to handle game services for the WSP offering them. Alternately, the game request may be received from a user/player via their MT 20, or some other party. For example, the game request may be made by a particular venue operator that desires to have a game offering at that venue during a particular event being held there.

The game request defines the parameters for the game to be played. The parameters may be selected from predefined options presented by the GS 10 or be otherwise configurable as desired. The parameters to be defined in and/or by the game request suitably include identification of the game to be played (i.e., the name of the game), criteria for starting the game (e.g., a minimum number of participants), game location information, game times (e.g., start and end times), participant eligibility criteria, prize identification, and the like. The game rules may be selectively configurable via the game request or preset for a particular identified game.

Optionally, game requests received or entered in advance of a game start time are stored until the start time or shortly before the start time, at which point they are processed. In this way, game planning can be handled well in advance of scheduled events during which it is desired to offer games for play. That is to say, e.g., the WSP can plan and maintain a whole calendar's worth of various games to be offered at various events and/or various locations. Similarly, regularly or periodically scheduled game offerings can be implemented on a repetitive basis, optionally with the game to be played changing from time to time. For example, various games may be scheduled for every Saturday at a particular amusement park. The games may then be sponsored and/or promoted by the amusement park, the WSP offering the game service, or both.

With respect to game requests submitted from a MT 20 by a user/player, the game request may be for immediate play or future play. In the case of immediate play game requests, it is to be appreciated that the user/player is still not burdened with having to prearrange the game, and the game may not be limited to prearranged participants. In the case of future play game requests, it is to be appreciated that the user/player has the option of requesting a game for a particular place and/or time when they know in advance that they will be in that place at that time and will want to play a game. Additionally, by using appropriate participant eligibility criteria, the party (be it a user/player or otherwise) submitting the game request can selectively regulate the participants with which the game will be played. That is to say, the party submitting the game request can designate in the eligibility criteria only particular participants (e.g., by their name or screen name) with which the game is to be played, or alternately the eligibility criteria may leave the game open to all registered players. For example, using preference information from the database 40, the WSP can use the participant eligibility criteria to target certain game offerings to only those MTs 20 of users/players who favor the game being offered. Alternately, other preference information from the database 40 may likewise be used in game requests to target selected MTs 20 based on the current time or the current location of the MTs 20 which is obtained from the LS 60.

Optionally, the GS 10 is programmed to automatically generate and process game requests based on the current time, the monitored location of mobile terminals 20 as obtained from the LS 60, and preference information from the database 40. Suitably, the game request is automatically generated when the number of registered MTs 20 detected within a determined relative proximity to one another reaches or exceeds a determined threshold. For example, the game offered is randomly selected or it is the favored game of the majority of users/players making up the group that triggered the game request, and participant eligibility is optionally limited to that group.

At step 120, location determinations for a given game request are made by the GS 10. The location determinations that are made optionally include defining the game arena in accordance with the game request parameters and using information from the LS 60 to identify those MTs 20 within or near the game arena. The game area may be defined to be associated with geographic boundaries or information from the database 36 is used to correlate the geographic location of cells 34 and BS 32 providing coverage therefor with the defined game arena. Depending on the game request parameters, the game arena may simply be defined as one or more particular cells 34. Alternately, the game arena boundaries may be arbitrarily defined relative to cell boundaries. In either case, the BS 32 are identified which sufficiently provide coverage for the game arena by identifying the cells 34 or portions thereof that overlap the game arena and cross referencing the cells 34 to the BS 32 using the database 36.

With respect to a game request received from a MT 20, in particular an immediate play game request, the game arena is optionally defined as a determined area surrounding the current location of the MT 20 submitting the request, e.g., using the location obtained from the LS 60. Suitably, the game arena in this case is defined as the cell 34 from which the game request is received.

For certain games, other specific locations are also defined in accordance with the game request parameters. Optionally, these other specific locations may include a starting line or point, a finish line or point, the location of targets for a scavenger hunt, a home base or safe harbor for a game of tag, etc. During game play, the GS 10 can monitor (via the LS 60) the location of each participating MT 20 relative to these other specific locations, e.g., to ensure compliance with game rules, to provide clues or guidance to players which are attempting to reach or find a specific location, and the like.

At step 130, the GS 10 sends invitations to the MTs 20 inviting their users to join or participate in a game. The invitation optionally communicates information that the user will want so that they can decide whether or not to accept the invitation and participate in the game. For example, the invitation optionally includes any one or more of the following pieces of information (if applicable to the game being offered): the name of the game being played; the rules of the game; who is eligible to participate; the minimum number of players with which the game will be played; the game arena or boundaries; what prizes can be won; participation instructions; a starting time and/or location; or what any one or more of the game parameters are as determined in accordance with the game request.

The invitations are sent to the MTs 20 in one or more selected ways to satisfy the parameters defined in or by the game request. For example, when the game arena is coextensive with one or more entire cells 34 and there are no limits to participant eligibility, a SMS cell broadcast from the corresponding BS 32 is suitably used to communicate the invitation to all in service MTs 20 within the respective cells 34. In particular, with respect to this example, the GS 10 sends the SMS cell broadcast request along with the invitation to the SMSC 50 which then executes the broadcast via the one or more identified BS 32 providing coverage to the cells 34 which make up the game arena. Alternately, when participant eligibility is limited by the game request parameters, a WAP push is suitably used to communicate the invitation to only those MTs 20 of users meeting the eligibility criteria.

To sign-up players at step 140, the GS 10 collects responses to the invitations from the MTs 20 that received them. Suitably, the user responses to the invitation by choosing and returning an appropriate message from their MT 20, e.g., the message is optionally an "accept" or "decline" message or the like. Optionally, the response is communicated in the form of a SMS message that is routed to the GS 10 via the SMSC 50. In this manner, the user indicates their decision to participate or not participate in the offered game. The GS 10 maintains a list of users/players that are signed-up for the game.

When the game parameters provide for a minimum number of players to be sign-up before game play is carried out, decision step 150 is implemented to loop the process 100 back to step 140 until the minimum is reached or the game is cancelled. Once the minimum is reached, the process 100 continues on to the game playing step 160. Optionally, if the minimum threshold is not satisfied within an established time limit, the game is canceled and those already signed up are so notified. Suitably, if a user responses to an invitation after game play has begun or after a maximum number of participant have been signed-up, the GS 10 sends them an appropriate message indicating the same and informing them that they will not be participating in the game. Optionally, regrets may be expressed and the latecomer may be given the option to join another game or priority status for the next or some subsequent game.

The game is played at step 160. Depending upon the game, game play includes various communications being exchanged between the MTs 20 participating and the GS 10 using SMS messages or other communication types or communication protocols. For example, in a trivia game, questions are transmitted from the GS 10 to the participating MTs 20, and the MTs 20 that response with the correct answer score a point or otherwise get credit. Of course, any number of scoring systems are optionally implemented, e.g., only the first one or first few to answer may get credit, the score may be adjusted up or down based upon how fast the correct answer is provided or based upon the difficult of the question answered, points may be deducted for incorrect answers, etc. In scavenger hunt type game, the GS 10 optionally monitors the location of participating MTs 20 via the LS 60 and communicates clues or guidance to each MT 20 based upon its location relative to the location of the item to be found. For example, the clues may be "getting hotter" as the MTs 20 approach a target location or "getting colder" as the MTs 20 head away from a target location. Additionally, for games like tag or hide and seek or otherwise, the GS 10 optionally provides maps to the MTs 20 equipped with suitable displays. Using the location information from the LS 60, the maps optionally show the location of other participants' MTs 20. Suitably, the maps may be provided to all the participant or only to selected ones. For example, in a game of tag, optionally only the "it" participant receives the map.

During game play, the GS 10 also uses location information from the LS 60 to ensure compliance with game rules and/or scoring purposes, depending on the game. For example, if the location of an MT 20 is detected as going outside the game arena or is not detected at a designate starting location at the start of the game, then that player is optionally disqualified and the GS 10 optionally sends a suitable message to the player's MT 20 indicating the same. Again depending on the game being played, if the location of an MT 20 is detected at a designated finish line, then they are optionally declared the winner; or in a scavenger hunt type game, if the location of an MT 20 is detected at a location corresponding to a designated target item or area, then that player is credited with finding that item/area; or in a tag type game, if the location of the "it" MT 20 is detected within close proximity to another participating MT 20, then a tag is deemed to have been made such that the tagged MT 20 is now "it." Suitably, upon each of the foregoing occurrences, the GS 10 sends an appropriate message to the player's MT 20 indicating the score or other effect resulting therefrom. More generally, during game play, the GS 10 receives participant location information from the LS 60 and participant action messages or other input from the MTs 20 and applies the game rules in light of the current game state, thereby generating a resulting consequence or effect that is optionally communicated to one or more selected MTs 20.

When the game is concluded, the GS 10 announces the winner or winners at step 170. Suitably, the GS 10 sends the announcement to the participating MTs 20 in the same manner as the invitation. The announcement optionally identifies the winner(s) or raking of all the participants, identifies prizes awarded or won, provides information on claiming prizes, etc. Optionally, different announcements are sent to the various participants' MTs 20 based on whether or not they qualified for a prize, e.g., prize winners may receive notification that they have won and information regarding the prize and how to claim it, while non-winners may only receive notification that they have not won and an suggestion that they try again. In either case, the announcement also optionally includes an invitation to play another game.

It is to be appreciated that particular elements or components described herein may have their structure and/or functionality suitably configured and/or implemented as hardware, software, firmware or a combination of the same. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described herein as distinct from one another may be physically or functionally combined where appropriate.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of administering a game over a wireless telecommunications network serving a number of mobile terminals, said wireless telecommunications network including a number of base stations providing wireless communication coverage for corresponding geographically defined cells, the method comprising:
   (a) establishing a game offering in response to a triggering event;
   (b) designating a region in response to the established game offering;
   (c) locating mobile terminals within the designated region;
   (d) sending over the wireless telecommunications network, to mobile terminals within the designated region, an invitation to participate in a game in accordance with the established game offering, said invitation originating from a network entity other than a mobile terminal participating in the game; and,
   (e) collecting over the wireless telecommunications network, from mobile terminals to which the invitation was sent, responses to the invitation, said responses indicating that the invitation to participate in the game has been accepted or declined.

2. The method of claim 1, wherein step (a) includes:
   monitoring the location of mobile terminals; and,
   the triggering event is when a number of mobile terminals within a particular relative proximity to one another satisfies a threshold number of mobile terminals.

3. The method of claim 1, wherein step (a) includes:
   receiving a game request from a party desiring the game to be offered; and,
   the triggering event is receipt of the game request.

4. The method of claim 1, wherein at least one of the invitation and the responses are communicated using a short message service protocol.

5. The method of claim 1, wherein the designated region is coextensive with a cell, and the invitation is sent using a short message service cell broadcast from the base station providing wireless communication coverage for the cell.

6. The method of claim 1, further comprising:
(f) regulating play-of the game, said game being played with those mobile terminals from which responses to the invitation indicated acceptance.

7. The method of claim 6, further comprising:
(g) determining a winner of the game upon its completion; and,
(h) announcing over the wireless telecommunications network, to one or more of the mobile terminals participating in the game, an identity of the determined winner.

8. The method of claim 7, further comprising:
generating a map of the designated region; and,
during play of the game, providing the map over the wireless telecommunications network to one or more of the mobile terminals participating in the game.

9. The method of claim 8, wherein the map shows thereon the location of one or more of the mobile terminals participating in the game.

10. The method of claim 6, wherein step (f) includes:
monitoring the location of one or more of the mobile terminals participating in the game;
receiving over the wireless telecommunications network, input from one or more of the mobile terminals participating in the game;
keeping track of a current state of the game;
applying rules of the game to thereby generate a resulting consequence based on at least one of: (i) the location of one or more of the mobile terminals participating in the game, (ii) the received input; and, (iii) the current state of the game; and,
communicating the generated consequence over the wireless telecommunications network to one or more of the mobile terminals participating in the game.

11. The method of claim 1, further comprising:
tallying up how many responses indicate that the invitation has been accepted; and,
canceling the game if the tally does not satisfy an established threshold.

12. The method of claim 1, wherein the network entity is a game server operatively connected to the wireless telecommunications network.

13. A game service system for administering games over a wireless telecommunications network serving a number of mobile terminals, said wireless telecommunications network including a number of base stations providing wireless communication coverage for corresponding geographically defined cells, the game service system comprising:
means for establishing a game offering in response to a triggering event;
means for designating a region in response to the established game offering;
means for locating mobile terminals within the designated region;
means for sending over the wireless telecommunications network, to mobile terminals within the designated region, an invitation to participate in a game in accordance with the established game offering, said means for sending being a network entity other than a mobile terminal participating in the game; and,
means for collecting over the wireless telecommunications network, from mobile terminals to which the invitation was sent, responses to the invitation, said responses indicating that the invitation to participate in the game has been accepted or declined.

14. The game service system of claim 13, wherein one or more servers in operative communication with the wireless telecommunications network comprise the means for establishing, designating, locating, sending and collecting.

15. The game service system of claim 14, further comprising:
a short message service (SMS) center through which at least one of the invitation and the responses are routed as SMS messages.

16. The game service system of claim 15, further comprising:
a database in which mobile terminals are registered to be eligible for participation in games administered by the game service system.

17. The game service system of claim 16, wherein the database further contains preference information for each mobile terminal registered therein, said preference information identifying at least one of: (i) a type of game favored; (ii) a preferred time for game play; and, (iii) a preferred location for game play, said preference information being accessed to establish game offerings tailored to one or more of the mobile terminals for which the preference information is applicable.

18. The game service system of claim 17, further comprising:
means for monitoring historical patterns of participation by one or more of the mobile terminals in games administered by the game service system; and,
means for generating the preference information for respective mobile terminals based on the historical patterns observed.

\* \* \* \* \*